United States Patent
Blair et al.

(10) Patent No.: US 7,684,771 B2
(45) Date of Patent: Mar. 23, 2010

(54) METHOD AND APPARATUS FOR CONTROLLING POWER OF A TRANSMITTED SIGNAL

(75) Inventors: John L. Blair, Atlanta, GA (US);
Ming-Ju Ho, Fulton, GA (US);
Dukhyun Kim, Cobb, GA (US);
Michael S. Rawles, Morrisville, NC (US)

(73) Assignee: Agere Systems Inc., Allentown, PA (US)

( * ) Notice: Subject to any disclaimer, the term of this patent is extended or adjusted under 35 U.S.C. 154(b) by 636 days.

(21) Appl. No.: 11/560,400

(22) Filed: Nov. 16, 2006

(65) Prior Publication Data
US 2007/0087707 A1 Apr. 19, 2007

Related U.S. Application Data

(63) Continuation of application No. 09/917,870, filed on Jul. 31, 2001, now Pat. No. 7,158,765.

(51) Int. Cl.
*H01Q 11/12* (2006.01)
*H04B 7/00* (2006.01)

(52) U.S. Cl. ..................... 455/127.1; 455/522

(58) Field of Classification Search ............ 455/127.1, 455/522, 126, 127.2, 127.5
See application file for complete search history.

(56) References Cited

U.S. PATENT DOCUMENTS

| 6,434,135 B1 | 8/2002 | Ozluturk et al. |
| 2003/0027535 A1 | 2/2003 | Blair et al. |

OTHER PUBLICATIONS

Enright, R. et al., "OFDM Modem with Peak-to-Mean Envelope Power Ratio Reduction Using Adaptive Clipping" HF Radio Systems and Techniques, Jul. 7-10, 1997, Conference Publication No. 411, IEE, 1997, pp. 44-49.
Blair, John L. et al., "Method and Apparatus for Controlling Power of a Transmitted Signal" U.S. Appl. No. 09/917,870, filed Jul. 31, 2001.

*Primary Examiner*—William J Deane

(57) ABSTRACT

In the method and apparatus of controlling power of a transmitted communication signal, a communication signal is amplified and transmitted. At least one parameter on the transmitted signal is received, and a measure of interference with the transmitted signal is determined based on the received parameter. An average power level of the communication signal is increased by clipping the communication signal prior to amplification by an amount based on the determined measure.

20 Claims, 3 Drawing Sheets

METHOD AND APPARATUS FOR CONTROLLING POWER OF A TRANSMITTED SIGNAL

This application is a Continuation of prior application Ser. No. 09/917,870 filed on Jul. 31, 2001, now issued U.S. Pat. No. 7,158,765, to John L. Blair, et al. The above-listed Application is commonly assigned with the present invention and is incorporated herein by reference as if reproduced herein in its entirety under Rule 1.53(b).

BACKGROUND OF THE INVENTION

1. Field of the Invention

The present invention relates to the field of telecommunications, and more particularly, a method and apparatus for controlling the power of a transmitted signal.

2. Description of Related Art

Orthogonal Frequency Division Multiplexing (OFDM) is a special form of multi-carrier modulation having inherent robustness against multipath effect. For example, IEEE 802.11a specifies the Physical Layer Entry for an OFDM system that provides a wireless Local Area Network (LAN) with data payload communication capabilities from 6 to 54 Mbits/sec in the Unlicensed National Information Infrastructure (U-NII) frequency band. The system uses 52 sub-carriers which are independently modulated by using Binary Phase Shift Keying (BPSK), Quadrature Phase Shift Keying (QPSK), 16-Quadrature Amplitude Modulation (16-QAM) or 64-Quadrature Amplitude Modulation (64-QAM) associated with different coding rate for different data speed.

A major challenge for an OFDM-based communication system is the inherent high crest factor (peak-to-average ratio) of multi-carrier systems. Considerable output power back-off from the power amplifier (PA) saturation region will be needed to avoid distortion and spectral regrowth. The back-off for the power amplifier, however, reduces its efficiency. Because the peak transmitted power is usually constrained by regulatory limits, a large back-off of the power amplifier design to deal with the high crest factor has the effect of significantly reducing the average transmit power. The low average transmit power introduces several problems such as reducing radio coverage and making the transmitted signal more susceptible to interference.

So far, several crest factor reduction techniques have been proposed such as Reed-Muller codes, Golay sequences, subsets of block coding that avoid transmitting codewords with a large crest factor, and selective sub-carrier mapping to reduce the crest factor. However, as the number of sub-carriers increases, the coding rate slows and the coding process becomes more complicated (e.g. extensive computation, search, look-up tables). Unlike cellular/PCS systems that can afford costly power amplifiers, the power amplifier used in a wireless LAN needs to be simple and cheap. Clipping the OFDM signal is another way to reduce the crest factor. Clipping can be described as limiting the peak amplitude of an OFDM signal to the power amplifier input so that the undesirable effect of the amplifier non-linearity problem can be controlled. However, inadequate clipping introduces excessive out-of-band distortion.

SUMMARY OF THE INVENTION

In the method and apparatus according to the present invention, interference with the transmitted signal is monitored. When long term interference is encountered, the average power of the transmitted signal is increased by a first amount. And, when short term interference is encountered, the average power of the transmitted signal is increased by a second amount greater than the first amount. Increasing the average signal power in this manner compensates for the determined interference.

The average signal power is increased without causing the power amplifier to enter the saturation region. Consequently distortion and spectral regrowth are avoided. To increase the average power of the transmitted signal, the signal for transmission is clipped to remove undesirably high peaks, and then the gain of the signal is increased. The clipping level and gain are adjusted based on the amount of determined interference. Accordingly, the clipping level is increased by, for example, the first amount when long term interference is determined, and increased, for example, by the second amount when short term interference is determined.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF THE PREFERRED EMBODIMENTS

Figure 1:
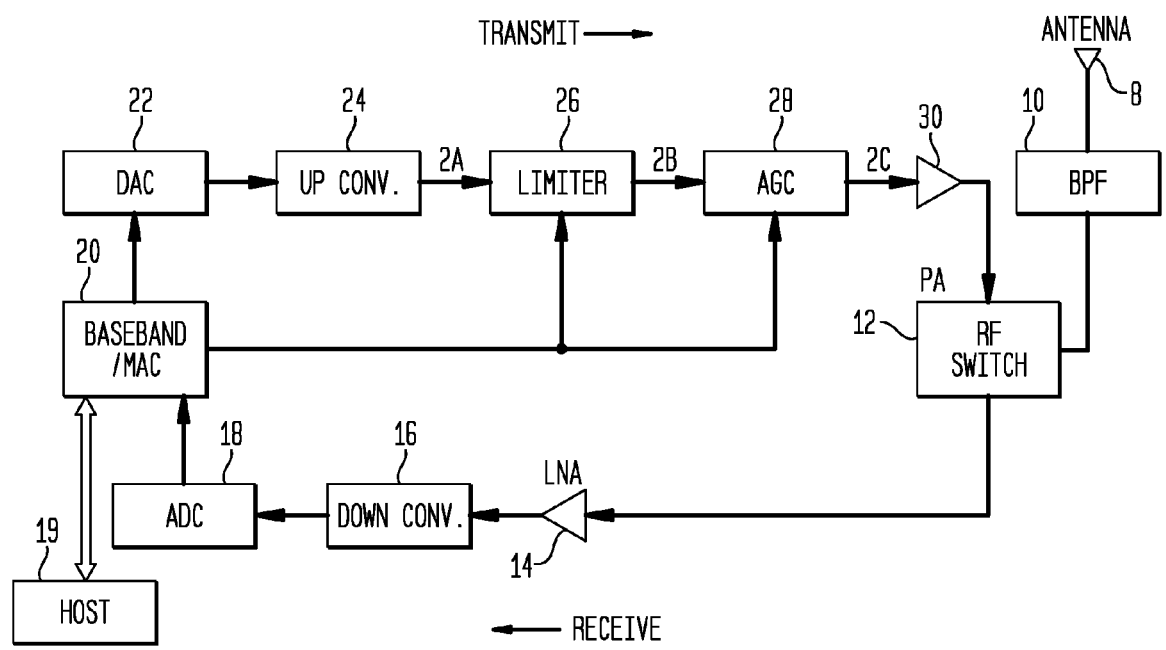
FIG. 1 illustrates a block diagram of an apparatus employing the method of the present invention.

FIG. 1 illustrates a block diagram of a communication apparatus such as a wireless Local Area Network (LAN) card or base station employing the method of the present invention. While the method of the present invention will be described as implemented by a wireless LAN, the method is not limited to this implementation. For example, the method could be implemented by a cellular communication system.

As shown in FIG. 1, an antenna 8 receives and transmits signals via a band-pass filter 10 and a duplexer 12. The duplexer 12 supplies the received signals to a low-noise amplifier 14. The amplifier 14 amplifies the signals and supplies them to a down converter 16, which down converts the radio frequency signal from the amplifier 14 to an intermediate frequency. An analog-to-digital converter (ADC) 18 converts the analog output of the down converter 16 to digital. A baseband/medium access controller (hereinafter "controller") 20 receives the output of the ADC 18. The controller 20 transfers received signals to a host 19 (e.g., a computer). Based on the signals received from the ADC 18, the controller 20 controls a limiter 26 and an automatic gain control (AGC) 28 according to the method of the present invention as described in detail below with respect to FIGS. 2 and 3.

Signals supplied from the host 19 to the controller 20 for transmission are supplied to a digital-to-analog converter (DAC) 22. The digital output of the DAC 22 is received by an up converter 24, which converts the received analog signals from an intermediate frequency to radio frequency. The limiter 26 clips the signals received from the up converter 26 based on control signals from the controller 20, and the AGC 28 gain controls the output of the limiter 26 based on control signals from the controller 20. A power amplifier 30 amplifies the output of the AGC 28, and supplies the result to the duplexer 12. The duplexer 12 passes the signal from the power amplifier 30 to the antenna 8 via the BPF 10.

Figure 2A:
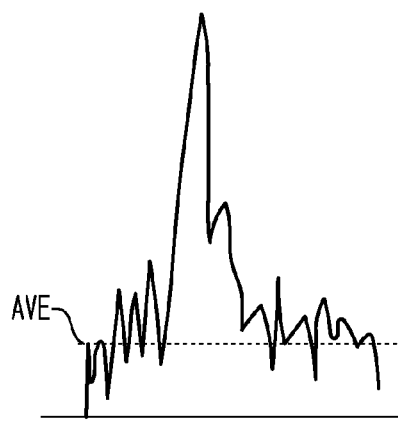
FIG. 2 illustrates waveforms output by elements in the block diagram of FIG. 1.
Figure 2B:
Figure 2C:
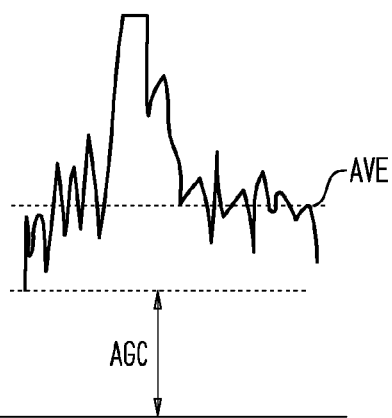

FIG. 2A illustrates the output of the up converter 24. Because of the high peak-to-average ratio of this signal, an increase in the gain of the signal will cause the power amplifier 30 to enter the saturation region, and distortion and spectral regrowth will result. FIG. 2B shows the limiter 26 clipping the output of the up converter at a clipping level set by the controller 20. Having clipped the peak of the signal, the gain of the signal can be increased by the AGC 28 as shown in FIG. 2C such that the average power of the signal is increased without causing distortion and spectral regrowth.

Figure 3:
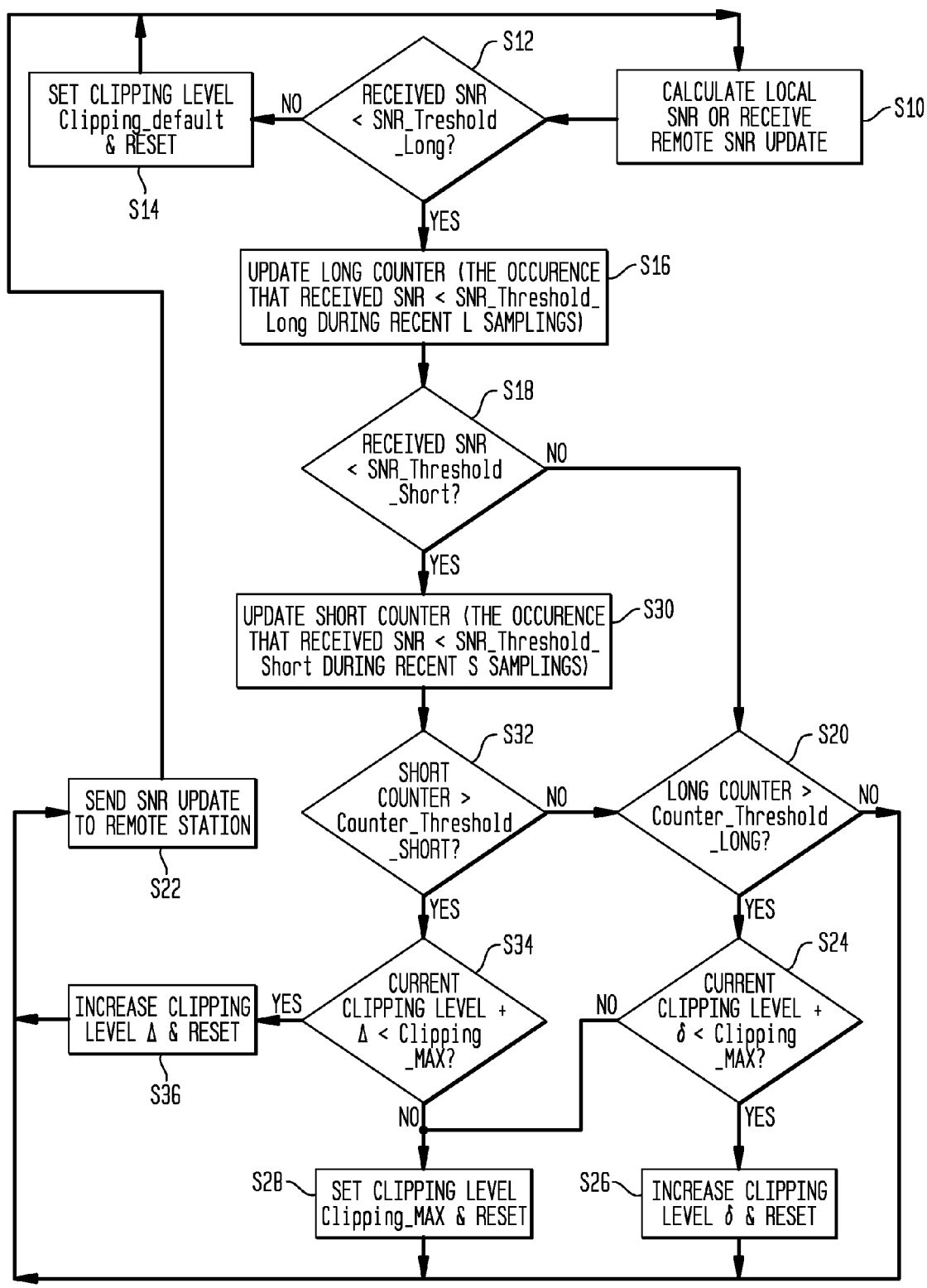
FIG. 3 illustrates a flowchart of an embodiment of the method according to the present invention.

The method by which the controller 20 controls the limiter 26 and the AGC 28 will now be described in detail with respect to FIG. 3. FIG. 3 illustrates a flow chart of the embodiment of the present invention employed by the controller 20. As shown, in step S10, the controller 20 receives signals via the antenna 8, the BPF 10, the duplexer 12, the amplifier 14, the down converter 16 and the ADC 18 from another transmission source such as a remote station (not shown). The signals either include a measurement of the signal-to-noise ratio (SNR) made by the other transmission source or provide a signal strength measurement of the signal transmitted by the apparatus of FIG. 1 as measured by the transmission source. Using the signal strength measurement, the controller 20 calculates the SNR in the well-known manner.

Next in step S12, the controller 20 compares the received or calculated SNR to a long threshold. If in step S12 the controller 20 determines that the received or calculated SNR (hereinafter "the SNR") is not less than the long threshold, then in step S14, the controller 20 sets the clipping level of the limiter 26 and the gain of the AGC 28 to predetermined levels. Also, in step S14 the long and short counters, discussed in detail below, are reset. However, if the controller 20 determines the SNR is less than the long threshold, then the controller 20 determines that the possibility of long term interference exists (hence the name long threshold) and in step S16 the controller 20 increments a long counter.

Subsequent to step S16, the controller 20 determines if the SNR is less than a short threshold in step S18. If the controller 20 determines that the SNR is not less than the short threshold, then in step S20, the controller 20 determines if the long counter exceeds a long count threshold. If not, then in step S22 the controller 20 sends the SNR calculated in step S10 to the remote station and processing returns to step S10.

In step S20, if the long counter does exceed the long count threshold, then the controller 20 determines that long term interference (e.g., a more permanent change in the environment affecting the SNR) exists. In step S24, the controller 20 determines if the current clipping level plus a first predetermined amount (e.g., 0.1 to 0.5 dB) is less than a maximum clipping level. If so, then in step S26, the controller 20 increments the clipping level of the limiter 26 by the first predetermined amount, increases the gain of the AGC 28, and resets the long and short counters. In a preferred embodiment, the gain of the AGC 28 is increased by the same first predetermined amount, but it will be appreciated from this disclosure that the present invention is not limited to increasing the gain in this manner. After step S26, processing proceeds to step S22.

In step S24, if the current clipping level plus the first predetermined amount is not less than the clipping maximum, then in step S28, the clipping level of the limiter 26 is set at the clipping maximum, and the gain of the AGC 28 is increased by the same amount required to increase the current clipping level to the clipping maximum; however, the present invention is not limited to affecting gain of the AGC 28 in this one-for-one manner. Also, in step S28, the long and short counters are reset. Processing then proceeds to step S22.

Returning to step S18, if the SNR is less than the short threshold, then in step S30 the controller 20 determines that the possibility of short term interference exists and increments a short counter. In subsequent step S32, the controller 20 determines if the short counter exceeds a short count threshold. If the short counter does not exceed the short count threshold, then processing proceeds to step S20. However, if the short count exceeds the short count threshold, then the controller 20 determines that short term interference (e.g., a transmission by a different transmission source) exists. In step S34, the controller 20 determines if the current clipping level plus a second predetermined amount (e.g., 1 to 3 dB), greater than the first predetermined amount, is less than the maximum clipping level in step S34. If so, then in step S36, the controller 20 increments the clipping level of the limiter 26 by the second predetermined amount, increases the gain of the AGC 28, and resets the short and long counters. In a preferred embodiment, the gain of the AGC 28 is increased by the same second predetermined amount, but it will be appreciated from this disclosure that the present invention is not limited to adjusting the gain in this manner. After step S36, processing proceeds to step S22.

In step S34, if the current clipping level plus the second predetermined threshold is not less than the clipping maximum, then processing proceeds to step S28.

As will be appreciated from the above description, when long term interference is encountered, the clipping level is slowly increased, while for short term interference, a quick increase in the clipping level occurs. In this way, the controller 20 is responsive to and compensates for the type of interference encountered. This methodology also prevents increasing the clipping level by too great a margin such that an unnecessarily large increase in the average signal power does not occur; thus, preventing undue interference caused by the transmitted signal.

The invention being thus described, it will be obvious that the same may be varied in many ways. For example, instead of or in addition to resetting the long and short counters, the long and short counters could be decremented at, for example, step S22 or other times at the discretion of the system designer. As another alternative, the long and short counters could be kept over a moving window of time or data samples. Such variations are not to be regarded as a departure from the spirit and scope of the invention, and all such modifications are intended to be included within the scope of the following claims.

We claim:

1. A method of reducing distortion of a transmitted RF signal, comprising:
    transmitting a first signal from a first transceiver to a second transceiver;
    receiving one of a measured signal-to-noise ratio (SNR) and a measured signal strength of said first signal from said second transceiver;
    determining, from said one of a measured SNR and a measured signal strength, a clipping level to be applied to signals transmitted subsequently by said first transceiver; and
    further determining, from said one of a measured SNR and a measured signal strength, a gain to be applied to said signals transmitted subsequently by said first transceiver.

2. The method recited in claim 1, wherein when said one of a measured SNR and a measured signal strength is said measured signal strength, and said measured signal strength is converted to a calculated SNR of said first signal.

3. The method recited in claim 2, wherein said clipping level is set to a default level when said measured or calculated SNR is not less than a predetermined minimum, and said clipping level is increased when said measured or calculated SNR is less than said predetermined minimum.

4. The method recited in claim 3, wherein said clipping level is increased by an increment δ when said measured or calculated SNR is less than a long-term threshold but not less than a short-term threshold, and said clipping level is increased an increment Δ greater than said increment δ when said measured or calculated SNR is less than said long-term threshold and said short-term threshold.

5. The method recited in claim 4, wherein when said measured or calculated SNR is less than said long-term threshold, but not less than said short-term threshold, said clipping level is increased only if said measured or calculated SNR is less than said long-term threshold for a period greater than a predetermined maximum.

6. The method recited in claim 4, wherein when said measured or calculated SNR is less than said long-term threshold and said short-term threshold, said clipping level is increased only if said measured or calculated SNR is less than said short-term threshold for a period greater than a predetermined maximum.

7. The method recited in claim 4, wherein said gain is increased when said clipping level is increased.

8. The method recited in claim 7, wherein said gain increase is substantially equal to said clipping level increase.

9. An RF transceiver, comprising:
a limiter configured to clip a first RF signal by a clipping level based on a clipping control signal;
a gain controller configured to amplify an output from said limiter based on a gain control signal;
a transmitter configured to transmit said first RF signal; and
a controller configured to:
receive a reply signal from a second transceiver, said reply signal including one of a measured signal-to-noise ratio (SNR) and a measured signal strength of said first transmission;
generate, in response to said one of a measured SNR and a measured signal strength, said clipping control signal to clip RF signals transmitted subsequently by said first transceiver, and
further generate, in response to said one of a measured SNR and a measured signal strength, said gain control signal to amplify said RF signals transmitted subsequently by said first transceiver.

10. The RF transceiver recited in claim 9, wherein when said one of a measured SNR and a measured signal strength is said measured signal strength;
said measured signal strength is converted to a calculated SNR of said first signal; and
said limiter is configured:
to increase said clipping level by an increment δ when said measured or calculated SNR is less than a long-term threshold but not less than a short-term threshold; and
to increase said clipping level by an increment Δ greater than said increment δ when said measured or calculated SNR is less than said long-term threshold and said short-term threshold.

11. The RE transceiver recited in claim 10, wherein said measured or calculated SNR is less than said long-term threshold, but not less than said short-term threshold, said clipping level is increased only if said measured or calculated SNR is less than said long-term threshold for a period greater than a predetermined maximum.

12. The RF transceiver recited in claim 10, wherein when said measured or calculated SNR is less than said long-term threshold and less than said short-term threshold, said clipping level is increased only if said measured or calculated SNR is less than said short-term threshold for a period greater than a predetermined maximum.

13. The RF transceiver recited in claim 10, wherein said gain is increased when said clipping level is increased.

14. The RE transceiver recited in claim 13, wherein said gain is increased by a value substantially equal to said increase of clipping level.

15. An RF communications system, comprising:
a first transceiver comprising:
a controller outputting a clipping control signal and a gain control signal;
a limiter clipping a first communication signal based on said clipping control signal;
a gain controller amplifying an output from said limiter based on said gain control signal; and
a transmitter configured to transmit said first communication signal; and
a second transceiver configured to transmit one of a measured signal-to-noise ratio (SNR) and a measured signal strength of said first transmission to said first transceiver,
wherein said controller is configured to determine, from said one of a measured SNR and a measured signal strength, said clipping level to be applied to signals transmitted subsequently by said first transceiver; and
said controller is further configured to determine, from said one of a measured SNR and a measured signal strength, a gain to be applied by said gain controller to said signals transmitted subsequently by said first transceiver.

16. The RF communications system recited in claim 15, wherein when said one of a measured SNR and a measured signal strength is said measured signal strength:
said measured signal strength is converted to a calculated SNR of said first signal; and
said limiter is configured to:
increase said clipping level by an increment δ when said measured or calculated SNR is less than a long-term threshold, but not less than a short-term threshold; and
to increase said clipping level by an increment Δ greater than said increment δ when said measured or calculated SNR is less than said long-term threshold and said short-term threshold.

17. The RF communications system recited in claim 16, wherein when said measured or calculated SNR is less than said long-term threshold, but not less than said short-term threshold, said clipping level is increased only if said measured or calculated SNR is less than said long-term threshold for a period greater than a predetermined maximum.

18. The RF communications system recited in claim 16, wherein when said measured or calculated SNR is less than said long-term threshold and less than said short-term threshold, said clipping level is increased only if said measured or calculated SNR is less than said short-term threshold for a period greater than a predetermined maximum.

19. The RF communications system recited in claim 16, wherein when said clipping level is increased, said gain is increased by a value substantially equal to said increase of clipping level.

20. The RF communications system recited in claim 16, wherein said first and second transceivers are LAN transceivers.

* * * * *